INVENTOR.
Paul Kollsman
BY Howard G. Russell
his ATTORNEY

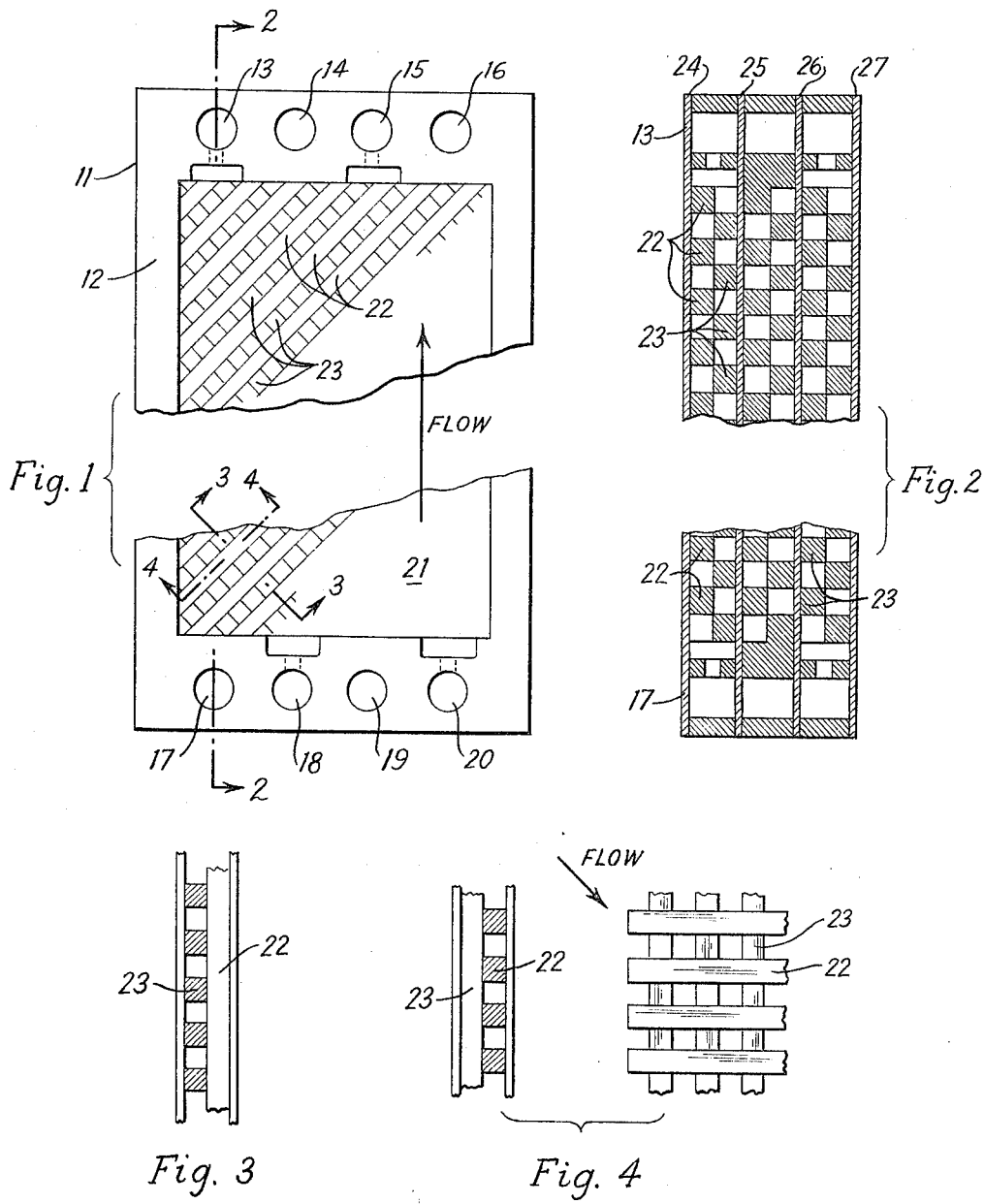

United States Patent Office 3,271,292
Patented Sept. 6, 1966

3,271,292
ION EXCHANGE MEMBRANES AND SPACERS
AND PROCESS OF MAKING THEM
Paul Kollsman, 100 E. 50th St., New York 22, N.Y.
Filed Nov. 8, 1960, Ser. No. 68,065
10 Claims. (Cl. 204—263)

This invention relates to improvements in electrodialysis and provides an ion conductive spacer structure for use between, and in connection with, membranes in an electrodialysis cell in which at least certain of the membranes are permselective membranes.

The improved spacer may be used between the permselective membranes, for example between an anion selective membrane and a cation selective membrane, or it may be used between two membranes of which one is selective and the other is neutral or amphoteric.

The improved spacer is conductive to ions of both polarities and is capable of picking up anionic and cationic constituents of an electrolyte at substantially the same point of the spacer structure whence the anions and cations are conducted, with low resistance, in opposite directions within the same spacer body or structure until the ions reach the respective membrane surfaces which then function in the usual manner.

The invention further provides a method, as well as method steps for producing the improved conductive spacer. The method and its steps may also be advantageously employed in the manufacture of electrically conductive structural bodies possessing ion exchange properties and serving as components of an electrodialysis cell for example as membranes or fillers. Produced according to the present method, such membranes and fillers possess superior properties.

I have found that the known methods and practices are ill-suited for producing membrane separators conductive to ions of both polarities. If, for example, an attempt is made to combine anion resin particles and cation resin particles either in the form of beads, or in the form of ground-up particles with a binder, the binder material tends to become an insulator between conductive particles, and, furthermore, anion resin particles tend to interrupt the passage of cations from one cation resin particle to another, and vice versa, with the result that the finished structure has poor conductivity.

According to the invention the ion exchange particles are combined in the form of fibers either straight or slightly curled so as to present a long dimension in one direction which is several times the dimension at right angles thereto. For example, the fibers should have a length which is a multiple of its mean diameter.

The fibers are combined either with or without a binder. In the event the fibers are of a material capable of forming a bond with itself under heat and pressure, such materials being "heat sealable" in the general sense of the term, or in the event the fibers are capable of forming a bond under pressure after being softened temporarily, for example by addition of a solvent later to be removed, the use of a binder may be dispensed with. In either case the strength of the resultant structure is determined by the strength properties of the ion exchange material.

The strength of the resultant structure may be enhanced by the use of a binder. The binder material may be liquid, to be solidified thereafter, or it may be solid in which event it may also have fibrous form for more convenient, and even, mixing with the ion exchange material.

Thus, according to the invention, particles of fibrous shape are employed at least for the anion exchange and the cation exchange components which are combined with a binder forming a structural matrix within which the ion exchange resin particles are held in place.

The matrix forming binder may be introduced either in liquid form into a conglomerate of fibrous ion exchange particles to fill the interstitial spaces between the fibers, or the conglomerate may be formed in the presence of a binder material in liquid form. In both instances the liquid binder or matrix material is subsequently solidified by polymerization, copolymerization, crosslinking, cooling or in other appropriate ways.

The matrix component may also be introduced in solid form as a part of the originally formed conglomerate, to be liquified subsequently to bind the ion exchange resin particles into a unitary structure of a definite shape, for example grid shape in case of a spacer, or a bead in case of a filler particle, followed by the step of hardening the structural matrix.

The structural matrix serves as a form-giving, and ion exchange particle retaining, structural element and is not to be confused with the ion exchange matrix of the ion exchange material proper which latter matrix comprises the fixed charges or ion exchange sites which bind the exchangeable counter ions to them. For this reason the binder material will generally be referred to as "structural matrix" in this specification, in distinction from the "ion exchange matrix" of the ion exchange material proper.

The fibers may be straight or crimped and are elongated bodies of ion exchange resin preferably of a length at least three times their mean diameter. If the structural body to be produced is a membrane, the fiber length may be of the order of the membrane thickness.

In the conglomerate each fibrous particle makes contact with several others of its own polarity. In an amphoteric structure a path of considerably higher conductivity is thus provided than in an assembly of beads, for example. The longitudinally extended shape of the fibers provides many contact points or areas, if compressed, and the contact is far less interfered with by a non-conductive binder than if the ion exchange particles were beads. In the latter case it is well known that the volumetric percentage of the binder material is limited to about 38 percent, as a higher percentage will cause the conductive beads to float substantially without contact with one another in the binder.

On the other hand, the strength of the structural body depends to a large extent on the percentage of the binder, so that a low binder content, which is conducive to improved conductivity, leads to reduced strength and vice versa. Fibrous ion exchange resin particles are not subject to such limitations.

The ion exchange resin particles employed in practicing this invention may be of any known composition and may be made from polystyrene, Saran, polyethylene, all of which are commercially available in fibrous form. For example, styrene may be graft-polymerized to polyethylene as described in South African Patent 1,900/57. If the polyethylene is in fibrous form, fibrous ion exchange resin particles result. Other methods of making ion exchange materials, and adaptable to the formation of fibrous particles are disclosed in South African Patent 1,202/55 (TNO).

The components forming the structural matrix may be any resins capable of being first liquified or plasticised and then solidified. Such compounds may be thermoplastic or thermo setting resins, or resin liquids capable of solidification by cooling, crosslinking, or polymerization, such as polyethylene, polystyrene, polypropylene, nylon, polyacrylonitrile, Dynel, various rubber compounds, polyurethane, styrene with divinyl benzene, and the like. Such compounds may be introduced in a dissolved or softened state by addition of a solvent later to be removed by drying or by coagulation to drive out the solvent.

Preferably the structural matrix forming resins are introduced in the form of thermoplastic fibers, such as polyethylene fibers, so that the two or three compounds making up the conglomerate are of substantially the same shape and will form a uniform mixture which is subsequently molded under pressure.

The formation of the membrane spacer, membrane or other ion exchange body may proceed by first forming a felt-like substance composed of ion exchange resin fibers with a temporary, preferably water soluble binder added in a quantity sufficient to give the felt-like structure physical strength for subsequent treatment and handling, but small enough so that the preformed structure retains substantial porosity.

The preformed shape is then impregnated with a compound which forms the structural matrix after solidification, whereafter the original temporary binder is dissolved.

The fibers are preferably in a non-swelled condition if compared to the condition they would assume if immersed in aqueous 0.1 N NaCl solution.

*Example 1.*—Sulfonated crosslinked polystyrene fibers and quaternized crosslinked polystyrene fibers in different relative proportions, as shown below, were combined with polyethylene fibers, all fibers being about 0.005 mm. thick and 0.1 mm. long. One-half part of benzophenone was added as catalyst for the subsequent irradiation treatment and the mixture was heated to 130° C., compressed under 1000 lbs./sq. inch pressure and molded to form a sheet or a spacer. Sheet and spacer were then cooled while under pressure. The resultant molding was removed from the mold, irradiated from all sides at 75° C. by two 100 watt germicidal mercury vapor lamps for one hour, followed by immersion in an aqueous solution of 1 N KCl at 95° C. for three hours. The membranes and spacer were then tested.

|  | Ion exchange particles (parts) | | Structural matrix resin, polyethylene |
|---|---|---|---|
|  | Sulfonated | Quaternized |  |
| Membrane AC-1 | 6 | 54 | 40 |
| Membrane AC-2 | 12 | 48 | 40 |
| Membrane AC-3 | 18 | 42 | 40 |
| Membrane AC-4 | 24 | 36 | 40 |
| Membrane AC-5 | 30 | 30 | 40 |
| Membrane AC-6 | 36 | 24 | 40 |
| Membrane AC-7 | 42 | 18 | 40 |
| Membrane AC-8 | 48 | 12 | 40 |
| Membrane AC-9 | 54 | 6 | 40 |
| Spacer AC-10 | 30 | 30 | 40 |
| Spacer AC-11 | 40 | 20 | 40 |
| Membrane AC-12 | 30 | 30 | 60 |
| Membrane AC-13 | 35 | 25 | 80 |
| Spacer AC-14 | 30 | 30 | 20 |
| Spacer AC-15 | 30 | 30 | 15 |

The following were made from cation fibers of polyethylene with graft-polymerized styrene, subsequently sulfonated, and from anion fibers of polyethylene with graft-polymerized styrene, subsequently quaternized.

|  | Sulfonated | Quaternized | polyethylene |
|---|---|---|---|
| Spacer AC-16 | 30 | 30 | 40 |
| Membrane C-0 | 60 | 0 | 40 |
| Membrane A-0 | 0 | 60 | 40 |

The following spacers were made from shredded ion exchange membrane material of a thickness of 0.5 mm. into strips of 0.1 mm. length and 0.1 mm. width. The sulfonated fibers were cut from Amfion cation membrane material, the quaternized fibers from Amfion anion membrane. Amfion membranes are available in the trade and are composed of polyethylene having styrene polymerized thereto containing ion exchange groups. The cation membrane contains sulfonic acid groups, the anion membrane contains quaternary ammonium groups. The membrane fibers were heated to 130° C. and compressed under 1000 lbs./sq. inch pressure, then irradiated and equilibrated as above stated.

| Spacer | Ion exchange particles (parts) | | Matrix resin, polyethylene |
|---|---|---|---|
|  | Sulfonated | Quaternized |  |
| AC-17 | 50 | 50 | 40 |
| AC-18 | 55 | 45 | 40 |

*Example 2.*—Fibers of ion exchange resin of 0.005 mm. thickness and 0.1 mm. length were mixed with styrene and divinyl benzene to which benzoyl peroxide was added in an amount equal to one-half percent of the total weight of the mixture. The mixture was cast into a mold under pressure and the pressure of 100 lbs./sq. inch was maintained for three hours at 115° C. The mold was then cooled, the molding removed and equilibrated in aqueous 1 N KCl solution for six hours at 95° C. The ratio of ion exchange compounds and structural matrix resin were as follows:

|  | Ion exchange particles (parts) | | Structural matrix | |
|---|---|---|---|---|
|  | Sulfonated | Quaternized | Styrene | Divinyl benzene |
| Membrane C-17 | 70 | 0 | 25 | 5 |
| Membrane A-18 | 0 | 70 | 25 | 5 |
| Spacer AC-19 | 35 | 35 | 25 | 5 |
| Spacer AC-20 | 25 | 25 | 45 | 5 |
| Spacer AC-21 | 25 | 25 | 60 | 7 |

*Example 3.*—The mixture of Example 2 was dispersed into an agitated aqueous solution of 3 N KCl to form droplets which were then heated in the solution to 110° C. for twelve hours under a pressure of 100 lbs./sq. inch. The resultant beads were then washed in water, then in ethyl alcohol and finally equilibrated in aqueous 1 N NaCl solution. The composition was as follows:

| Beads | Ion exchange particles (parts) | | Structural matrix | |
|---|---|---|---|---|
|  | Sulfonated | Quaternized | Styrene | Divinyl benzene |
| B-1 | 50 | 0 | 45 | 5 |
| B-2 | 40 | 0 | 50 | 10 |
| B-3 | 25 | 25 | 40 | 5 |
| B-4 | 30 | 20 | 40 | 5 |
| B-5 | 0 | 50 | 40 | 5 |
| B-6 | 60 | 0 | 35 | 5 |
| B-7 | 35 | 30 | 30 | 5 |
| B-8 | 0 | 40 | 55 | 5 |

The beads had satisfactory physical strength and the ion exchange characteristic of typical beads was as follows:

| Beads | Milliequivalent of ions exchanged per gram of dry resin | |
|---|---|---|
|  | Cations | Anions |
| B-1 | 1.81 | 0 |
| B-3 | 0.77 | 0.72 |
| B-7 | 1.04 | 0.89 |
| B-8 | 0 | 1.26 |

*Example 4.*—Ion exchange resin fibers were mixed with a highly viscous solution at 80° C. of Dynel in dimethyl formamide with one-half of one percent of benzophenone added as a catalyst. Dynel is a commercially available copolymer material composed of six parts of vinyl chloride and four parts of acrilonitrile. The mixture was heated to 110° and cast into forms of membranes and spacers, then dried in hot air and compressed under 500 lbs./sq. inch pressure while a small quantity of dimethyl formamide was still present to provide plasticity. The structures were then irradiated from all sides for two hours by two 100 watt mercury vapor germicidal lamps. The irradiated structures were then immersed in aqueous 1 N KCl solution of 80° C. Certain structures were treated in the KCl solution at 90°, 100°, 120° and 135° C. under pressure.

The ion exchange fibers consisted of crosslinked polystyrene quaternized and sulfonated, respectively, of an average fiber dimension of between 0.0005 mm. and 0.005 mm. in diameter and 0.1 mm. in length.

|  | Ion exchange particles | | Structural matrix, Dynel |
|---|---|---|---|
|  | Sulfonated | Quaternized |  |
| Membrane C-27 | 77 | 0 | 23 |
| Membrane A-28 | 0 | 77 | 23 |
| Membrane C-29 | 51 | 0 | 49 |
| Membrane AC-30 | 40 | 11 | 49 |
| Spacer AC-31 | 36 | 36 | 28 |
| Spacer AC-32 | 28 | 23 | 49 |

*Example 5.*—Fibers of sulfonated crosslinked polystyrene and quaternized crosslinked polystyrene of an average diameter of between 0.0005 and 0.005 mm. and 0.1 mm. length were combined with a small quantity of animal glue dissolved in water and formed into a felt or paper-like sheet. The sheet was then dried in air, soaked in styrene and divinyl benzene as in Example 2 with one-half percent of benzoyl peroxide and heated between glass plates to a temperature of 110° C. under 100 lbs./sq. inch pressure for three hours. The glass plates with the sheet between them were then cooled, the sheet removed and immersed in aqueous 1 N KCl solution for six hours at a temperature of 95° C.

|  | Ion exchange Particles | | Structural matrix: 95 parts styrene, 5 parts divinyl benzene |
|---|---|---|---|
|  | Sulfonated | Quaternized |  |
| Membrane C-33 | 100 | 0 | 26.5 |
| Membrane A-34 | 0 | 100 | 41.2 |
| Membrane AC-35 | 50 | 50 | 40.4 |

*Example 6.*—For comparison purposes membranes were prepared according to the procedure of Example 1 except that ground-up particles of Amberlite IR-120 and Amberlite IRA-400 of a particle diameter of about 0.2 mm. were substituted for the fibrous particles. Amberlite IR-120 is a commercially available cation exchange material, a sulfonated copolymer of polystyrene and divinyl benzene. Amberlite IRA-400 is a commercially available anion exchange material which is a quaternized copolymer of polystyrene and divinyl benzene.

|  | Ion exchange particles | | Structural Matrix, polyethylene |
|---|---|---|---|
|  | IR-120 | IRA-400 |  |
| Membrane AC-37 | 30 | 30 | 60 |

*Example 7.*—Spacers and membranes were made by bonding, without binder, and molding a mixture of fibrous quaternized and sulfonated polyethylene/styrene graft polymer particles of an average diameter of 0.02 mm. and an average length of 0.15 mm. The mixture was wetted by a solution of one percent benzophenone in benzene, thereafter dried, and finally molded under 1000 lbs./sq. inch pressure at a temperature of 130° C. The molded structures were cooled, irradiated at 70° C. for one hour by two 100 watt mercury vapor germicidal lamps and activated by immersion in aqueous 1 N NaCl solution at 95° C.

In order to improve the bond between the anionic and cationic resin particles, certain spacers and membranes were irradiated in a vacuum of about 10 mm. Hg and others in a hydrogen atmosphere. Both these treatments improved the heat resistance and the tensile strength of the spacers and membranes.

|  | Ion exchange particles | |
|---|---|---|
|  | Sulfonated (in K form) | Quaternized (in Cl form) |
| AC-38 | 50 | 50 |
| AC-39 | 60 | 40 |
| AC-40 | 40 | 60 |
| AC-41 | 80 | 20 |
| AC-42 | 20 | 80 |

*Example 8.*—Spacers and membranes were produced by bonding and molding under heat and pressure without a separate binder material as set forth in Example 7, fibrous particles in the form of cut strips of about 0.1 mm. width and 0.9 mm. length of Amfion cation material and Amfion anion material.

|  | Ion exchange particles | |
|---|---|---|
|  | Amfion cation | Amfion anion |
| AC-43 | 50 | 50 |
| AC-44 | 60 | 40 |
| AC-45 | 40 | 60 |
| AC-46 | 80 | 20 |
| AC-47 | 20 | 80 |

*Area resistance tests.*—Sample membranes were tested for area resistance.

Area resistance (ohms/cm.$^2$)
AC-1 _____ 9.7
AC-5 _____ 20.4
AC-12 _____ 113
AC-37 _____ 1920

Membranes AC-12 and AC-37 both contain 50 percent binder material, yet the resistance of membrane made from fibrous particles is only a fraction of the membrane made from non-fibrous particles.

In the drawings:

FIG. 1 is a plan view of a preferred form of membrane spacer;

FIG. 2 is a sectional side view of an assembly of spacers and membranes, the section through certain spacers being taken on line 2—2 of FIG. 1;

Figure 6:
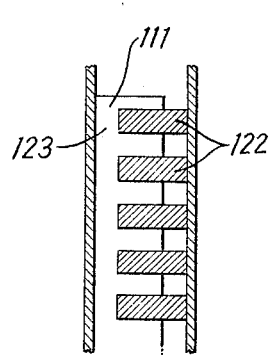
Figure 5:
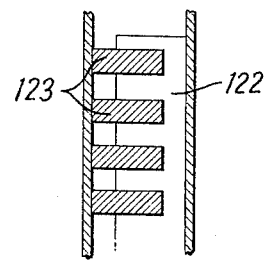
Figure 7:
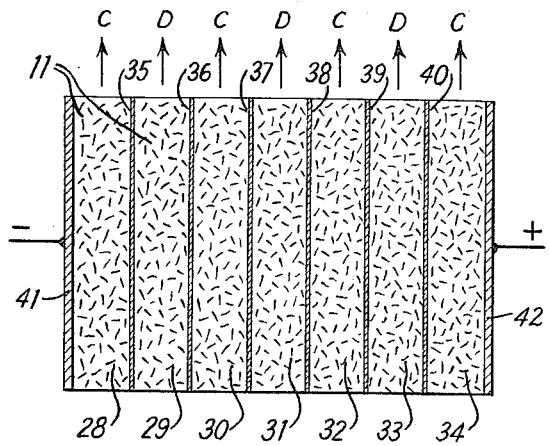
Figure 8:
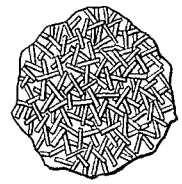

FIGS. 3 and 4 are sectional views of spacer portions, the section being taken on lines 3—3 and 4—4 of FIG. 1;

FIGS. 5 and 6 illustrate modified spacer dimensions, FIGS. 5 and 6 corresponding to FIGS. 3 and 4, respectively;

FIG. 7 is a diagrammatic illustration of a membrane and spacer arrangement of an electrodialysis cell;

FIG. 8 illustrates a random arrangement of elongated particles; and

Figure 9:
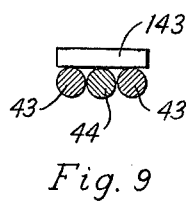

FIG. 9 is a diagrammatic illustration of a preferred minimum length to diameter ratio.

The spacer 11 comprises a peripheral frame portion 12 having duct forming apertures 13, 14, 15, 16 and 17, 18, 19, 20, of which ducts 13, 15, 18 and 20 communicate with the central portion 21 which is traversed by ribs 22 and 23 in two levels disposed substantially at right angles to one another. Thus liquid entering through ducts 18, 20 and leaving through ducts 13, 15, encounters substantially equal resistance from both sets of ribs assuming that both sets are of equal height as shown. The flow meets the ribs at an angle about 45 degrees under and over the ribs, thereby contacting a far larger spacer surface area than the area of membranes 23, 25, 26 and 27 shown in FIG. 2.

In FIGS. 5 and 6 reference numerals are used differing from those in FIG. 2 by 100 to identify corresponding parts. The spacers 111 are thicker than the spacers 11 and their ribs overlap or intermesh centrally to provide an even larger spacer area.

Spacers were constructed according to FIGS. 1 to 4 having a thickness of 2 mm. and square ribs of 1 x 1 mm. cross section.

The spacers were installed in a test cell comprising seven chambers 28 to 34, each chamber measuring 200 x 50 mm. and containing a spacer 11 between membranes 35 to 40, the membranes being cation membranes and anion membranes in alternating sequence. Electrodes 41 and 42 of platinum are arranged in the end compartments 28 and 34. The presence of a spacer in each chamber permits any intermediate chamber 29 to 33 to be made a deionization compartment or a concentrating compartment by reversal of the polarity of the electrodes.

Ionic liquid in the form of brackish water containing predominantly NaCl and having a resistivity of 410 ohm-cm. was passed through each of the chambers from bottom to top at the rate of 50 cc./min. Potential applied to the electrodes: 6 volts. The resistivity of the effluent of the central deionization chamber 31 was determined for testing purposes.

*Test 1.*—Membranes C–O and A–O. Spacers tested; non-conductive spacer of polystyrene, conductive spacers AC–10 and AC–6.

Resistivity (in ohms-cm.):
    With non-conductive spacer _____ 770
    With AC–10 spacers _____ 2,380
    With AC–6 spacers _____ 2,710

The test showed that the membranes performed as permselective membranes resulting in substantial deionization of the brackish water. The degree of deionization was materially improved by the use of the ion conductive spacers. The highest degree of demineralization was obtained by a spacer containing a greater percentage of cation exchange resin for conducting the relatively slow Na ions than anion exchange resin for conducting the faster Cl ions.

*Test 2.*—Test cell comprising two cation membranes C–O defining a treatment chamber between two electrode chambers. All three chambers measured 200 x 50 x 2 mm. and contained a spacer. Electrolyte: hard water containing 372 p.p.m. of magnesium and calcium. Flow rate: 50 cc./min. through each chamber. Potential: 4 volts.

Results: P.p.m.
    With non-conductive polystyrene spacer _____ 295
    With spacer C–O _____ 94

*Test 3.*—Test cell and conditions as in test 2 except that aqueous 0.1 N NaCl solution was passed through the electrode chambers instead of hard water.

Result with spacer C–O: 73 p.p.m.

*Test 4.*—The C–O spacer of test 3 was replaced by a charge of B–1 beads. Potential: 6 volts.

Result with beads B–1: 36 p.p.m.

FIG. 9 illustrates diagrammatically an arrangement of fibers 43 of one polarity separated by a fiber 44 of the opposite polarity, but bridged by a further fiber 143 of the same polarity which for this purpose should have a minimum length of about three times the fiber diameter.

What is claimed is:

1. An ion conductive membrane spacer of substantially lattice type form composed of anion exchange resin particles and cation exchange particles, both types of particles being in random arrangement, and predominantly in the shape of fibers having a length exceeding three times their mean diameter.

2. An electrodialysis cell comprising spaced electrodes, membranes dividing the space between the electrodes into chambers, at least one of said chambers being a deionization chamber bordered by at least one permselective membrane; an ion conductive spacer in said deionization chamber, said spacer comprising a structural matrix of resin material and, within the matrix, anion exchange resin particles and cation exchange particles predominantly of fibrous shape and substantially random arrangement, said spacer having oppositely directed membrane contacting surfaces; and means for conducting liquid to be deionized through said deionization chamber.

3. An electrodialysis cell as set forth in the preceding claim 2 in which the spacer is of latticework construction comprising a first set of spaced ribs contacting one membrane and a second set of spaced ribs extending at an angle to the first set and contacting the other membrane, said two sets of ribs being integrally joined at the points of intersection.

4. An electrodialysis cell comprising spaced electrodes, membranes dividing the space between the electrodes into chambers, at least one such chamber comprising a permselective membrane at least at one side; an ion conductive spacer in said last named chamber, said spacer comprising anion exchange resin particles and cation exchange resin particles, the particles of at least one polarity being of fibrous shape and substantially random arrangement, said spacer having oppositely directed contacting surfaces bearing against the two membranes of the chamber.

5. An electrodialysis cell comprising spaced electrodes, membranes dividing the space between the electrodes into chambers, at least one such chamber comprising a permselective membrane at least at one side; an ion conductive spacer in said last named chamber, said spacer comprising anion exchange resin particles and cation exchange resin particles, the particles of at least one polarity being of fibrous shape and substantially random arrangement, said spacer having oppositely directed contacting surfaces bearing against the two membranes of the chamber, the ionic concentration within the spacer material being lower than the ionic concentration within the permselective membrane material; and means for conducting liquid to be treated through said filler containing chamber.

6. An electrodialysis cell comprising spaced electrodes, membranes dividing the space between the electrodes into chambers, at least one such chamber comprising a permselective membrane at least at one side; an ion conductive spacer in said last named chamber, said spacer comprising anion exchange resin particles and cation exchange resin particles, the particles of at least one polarity being of fibrous shape and substantially random arrangement, said spacer having oppositely directed contacting surfaces bearing against the two membranes of the chamber, the solvent content of the spacer material per volumetric unit being higher than the solvent content of the permselective membrane material per volumetric unit; and means for conducting liquid to be treated through said filler containing chamber.

7. An electrodialysis cell comprising spaced electrodes, membranes dividing the space between the electrodes into chambers, at least one such chamber comprising a permselective membrane at least at one side; an ion conductive spacer in said last named chamber, said spacer comprising anion exchange resin particles and cation exchange resin particles, the particles of at least one polarity being of fibrous shape and substantially random arrangement, said spacer having oppositely directed contacting surfaces bearing against the two membranes of the chamber, the conductivity of the spacer material being higher than that of the permselective membrane material; and means for conducting liquid to be treated through said filler containing chamber.

8. In an electrodialysis cell the combination with a pair of spaced electrodes, of an electrically conductive structural body of ion exchange material in the space between the electrodes, the body comprising a resinous anion exchange component and a resinous cation exchange component in which at least one of said components is in the form of particles, in random arrangement, said particles being predominantly of elongated shape whose length exceeds three times their mean diameter.

9. The combination claimed in the preceding claim 8 in which both components are in the form of particles, in random arrangement, said particles being predominantly of elongated shape whose length exceeds three times their mean diameter.

10. The process of preparing a structural electrically conductive body comprising anion exchange groups and cation exchange groups, the process comprising the steps of first forming a conglomerate of anion exchange resin particles and cation exchange resin particles, both kinds of particles being predominantly in fibrous form; then introducing a binder component in liquid form into the interstitial voids of the conglomerate; and then solidifying the binder.

References Cited by the Examiner
UNITED STATES PATENTS

| | | | |
|---|---|---|---|
| 2,527,863 | 10/1950 | Webb | 18—47.5 |
| 2,688,008 | 8/1954 | Chaney | 260—45.5 |
| 2,794,777 | 6/1957 | Pearson. | |
| 2,815,320 | 12/1957 | Kollsman. | |
| 2,854,393 | 9/1958 | Kollsman. | |
| 2,906,684 | 9/1959 | Stoddard | 204—229 |
| 2,933,460 | 4/1960 | Richter | 260—2.2 |
| 2,938,849 | 5/1960 | Stoddard. | |
| 2,977,298 | 3/1961 | Cooke | 204—296 |
| 3,014,855 | 12/1961 | Kressman. | |
| 3,055,729 | 9/1962 | Richter | 260—2.2 |

JOHN H. MACK, *Primary Examiner.*

D. R. JORDAN, *Examiner.*